United States Patent [19]

Beling et al.

[11] 4,172,998
[45] Oct. 30, 1979

[54] CONDITION OPERATED LOAD CONTROL

[75] Inventors: Thomas E. Beling, Saxonville; Thomas Marx, Hingham, both of Mass.

[73] Assignee: Sigma Instruments Inc., Braintree, Mass.

[21] Appl. No.: 846,399

[22] Filed: Oct. 28, 1977

[51] Int. Cl.² .................. H01H 43/22; H01H 43/24; H01H 47/24
[52] U.S. Cl. ......................................... 328/2; 328/75; 328/130; 307/311; 307/41; 307/117; 340/309.4
[58] Field of Search ............................ 328/2, 75, 130; 340/309.4; 307/311, 117, 116, 39, 41

[56] References Cited

U.S. PATENT DOCUMENTS

| | | | |
|---|---|---|---|
| 3,638,189 | 1/1972 | Gamache et al. | 328/75 X |
| 3,829,784 | 8/1974 | Eshraghian | 328/130 |
| 3,999,133 | 12/1976 | Lee et al. | 328/2 |
| 4,035,661 | 7/1977 | Carlson | 328/130 X |
| 4,048,812 | 9/1977 | Thomason | 307/117 X |

Primary Examiner—John S. Heyman
Attorney, Agent, or Firm—Toren, McGeady and Stanger

[57] ABSTRACT

The disclosed apparatus operates a load in one mode in response to one cyclically occurring event and in a second mode at a specified time in the cycle regardless of the phase of the one event in the cycle. According to a specific embodiment, the apparatus turns on lights at sunset and turns them off at a later nighttime hour, preferably the same hour each night. A generator stores signals in an accumulating memory at one rate during daylight hours and at a faster rate, preferably twice the daylight rate, during nighttime hours. When the memory content reaches a preset level during the night, it turns off the switch that had turned on the lights at sunset and empties itself of storage until sunrise.

30 Claims, 14 Drawing Figures

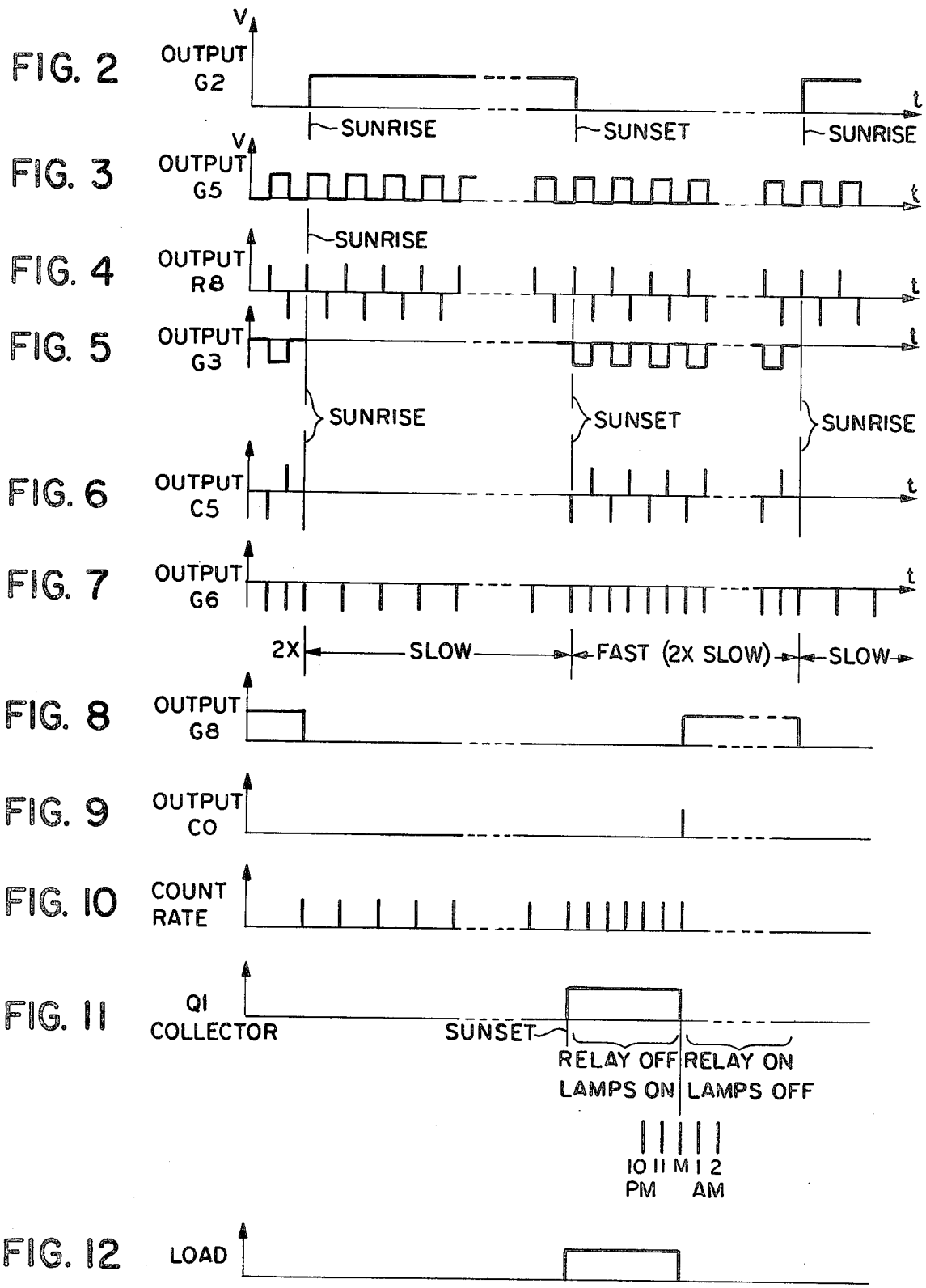

4,172,998

CONDITION OPERATED LOAD CONTROL

BACKGROUND OF THE INVENTION

This invention relates to condition-sensitive timing controls, and particularly to timers for systems which take one action in response to a cyclically recurring physical condition and another on the basis of a timing arrangement.

A typical application for such a device occurs in regulation of outdoor lighting equipment that is intended to illuminate an area during its normally used evening or nighttime hours. An example of a location where such control would be desirable is a parking lot of a shopping mall.

Condition-sensitive timing controls may be used to start air cooling systems or heating systems at sunrise and end their operation during the night.

One type of outdoor lighting equipment regulator is interposed between current carrying lines and a load. It is composed of a sensitive element that causes a relay to permit actuation of the lights at sunset in response to the diminishing ambient sunlight. At sunrise the photocell responds to the increasing ambient light and causes the relay to cut off power to the lighting equipment. Such devices are satisfactory but tend to waste substantial amounts of current during the early morning hours when the illuminated area is not used. Such type of device is also unsuitable for starting and stopping the aforementioned air cooling systems.

One available type of device is capable of solving the problem of energy waste in an outdoor lighting system by energizing the light only for a predetermined period of time after sunset. Such a system could be used for starting an air cooling operation at sunrise. However, such a system fails to consider changes in the times of sunrise and sunset throughout the year. If, during the summer, the timing mechanism used is set to turn off lights five hours after a 9 P.M. summer sunset, the same timing mechanism would extinguish the light five hours after a 5 P.M. winter sunset, namely at 10 P.M. Such a system is not completely satisfactory if the illuminated facilities are to be used to a specific hour. On the other hand, accommodating the timing mechanism to a 5 P.M. winter sunset, so that it would extinguish the lights nine hours later at the desired time of 2 A.M., would result in illumination throughout the night and after sunrise during the summer months.

An object of this invention is to improve controls of this type.

Another object of this invention is to alleviate the aforementioned difficulties.

SUMMARY OF THE INVENTION

According to a feature of the invention, a detector senses two cyclically occurring events to cause the load to operate in one mode, and a generator stores signals into an accumulator at a first rate in response to one of the events and at a second rate in response to the other of the events until the accumulator reaches a predetermined value when it shifts the load to its other operating mode and ends accumulation until the next one of the two events. As long as the time of the cycle remains the same and the phases of the events shift substantially equally in opposite directions within each cycle, the accumulator will change the mode at substantially the same absolute time within the cycle.

According to a more specific feature of the invention the load is shifted from one mode to another in response to sunrise or sunset and is shifted back to the first mode at a specified time.

According to another feature of the invention the generator stores signals in a memory at one rate between sunrise and sunset and at a second rate between sunset and sunrise, and the memory is set to change the load mode when it reaches a specific value and at the same time reset itself and turn itself off until the next sunrise. Suitable means change the operating mode of the load in response either to sunrise or sunset.

According to a more specific feature of the invention the second rate of storage is substantially twice as fast as the first rate.

According to yet another feature of the invention, the generator stores signals in a memory at one rate between sunrise and sunset, and after a photometric sensor has turned on a bank of lights at sunset, the generator stores the signals in the memory at twice the daylight rate until the memory reaches a predetermined value during the night, at which time the generator turns off the lights and resets itself to start storing signals again at sunrise.

The invention is based upon the recognition that storing the signals during nighttime hours at twice the daylight rate allows the memory to be set to reach its preset value at the same time each night. The reason for this phenomenon will be discussed in detail at a further point in the specification.

According to another feature of the invention, the signals are in the form of pulses and the memory in the form of a pulse counter. However, the invention can be practiced by generating a constant voltage level and storing it in a device such as a capacitor.

The above features represent merely a summary of the invention. The invention is defined in the claims forming a part of the specification. Other objects and advantages of the invention will become evident from the following detailed description when read in light of the accompanying drawings.

BRIEF DESCRIPTION OF THE DRAWINGS

FIGS. 2 through 12 are voltage-time graphs illustrating the voltages appearing at various points of the circuit in FIG. 1.

DETAILED DESCRIPTION OF PREFERRED EMBODIMENTS

Figure 1:
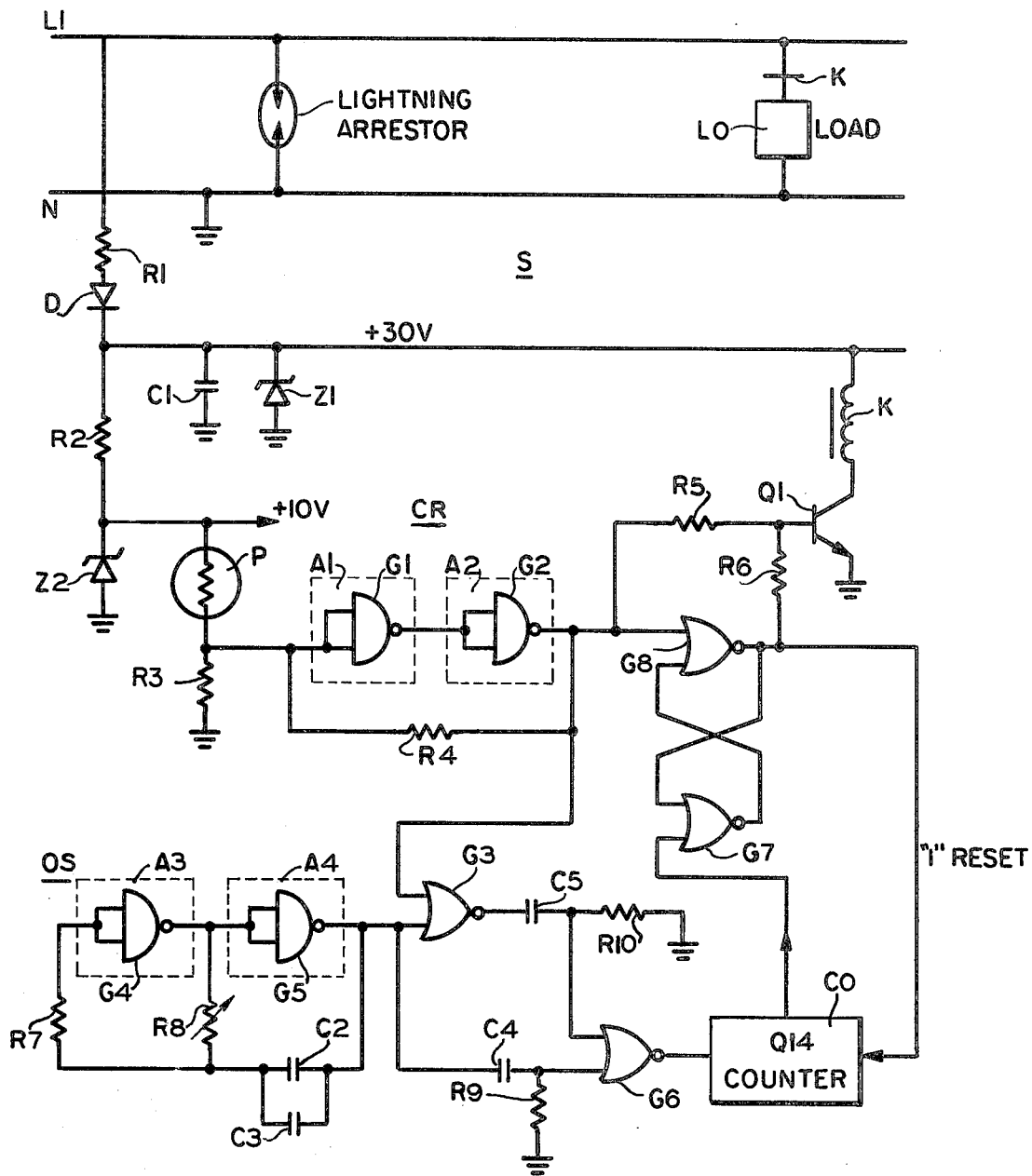
FIG. 1 is a schematic diagram of a load control system embodying features of the invention.

In the system of FIG. 1 a bank of lights which form a load LO are energized from sunset to a specified nighttime hour. A pair of AC excited lines L1 and N energize the load LO through a normally closed relay contact k. A relay coil (or just "relay") K controls the contact k. The contact k and relay K form part of a system S which causes the lines L1 and N to energize the lamp bank load LO from sundown to any selected pre-sunrise hour such as midnight.

For this purpose, a voltage dropping resistor R1 and a diode D1 establish a +30 voltage DC potential that ultimately energizes the relay K through a control switching transistor Q1. A filter capacitor C1 coacts with the resistor R1 to smooth the 30 volt potential. A Zener diode Z1 provides regulation. A second dropping resistor R2 and a second regulating zener diode 22 establish a regulated +10 volt potential that energizes the logic in the remainder of the system S.

To control the operation of relay K in response to sunset, a photoresistor P is exposed to ambient light. The photoresistor P forms a voltage divider across the 10 volt potential with a dividing resistor R3. During daylight the resistance of the photoresistor P is low so that the voltage across the resistor R3 is high. In darkness the voltage across resistor R3 is low.

Each of a pair of NAND gates G1 and G2 has its inputs connected together so that the two form respective cascade-connected amplifying inverters A1 and A2 that respond to the voltage across resistor R3. A positive feedback resistor R4 of suitable value causes the resulting circuit CR to behave as a Schmitt trigger. That is, the circuit CR shifts abruptly between two distinct outputs in response to smaller changes in the input. Thus, once the R3 voltage reaches a threshold value in response to increasing ambient light at sunrise the output of gate G2 abruptly rises to a maximum. At sunset when the R3 voltage falls below a second but lower threshold, the output at gate G2 abruptly drops to a minimum. The daylight high at the gate G2 output turns on a transistor Q1 through a resistor R5 that forms an OR gate with a resistor R6. This energizes the relay K, opens the contact k, and deenergizes the load L. At sunset, the low at the output of gate G2 turns off transistor Q1, deenergizes relay K, closes the contact k, and turns on the bank of lights in load LO. These then illuminate the area to be lighted.

At sunrise, the high output of gate G2 also appears on the input of a NOR gate G3 and drives the G3 output to a low. The other input to the gate G3 cannot then affect this low output because whether the input is high or low the G3 output remains low. This other input arrives from a continuously-operating free-running square-wave oscillator OS. In the latter, each of two NAND gates G4 and G5 has its inputs connected together. The gates G4 and G5 then behave as respective inverting amplifiers A3 and A4. The NAND gates are connected for oscillatory feedback. One feedback arrangement is composed of two parallel capacitors C2 and C3 and a series connected temperature compensating resistor R8 between the output of amplifier A4 and the input of amplifier A3. A second path is directly between the gate G4 output and the gate G5 input. A square wave output results. A variable shunting resistor R8 varies the oscillating frequency.

A differentiating circuit composed of a series capacitor C4 and a shunt resistor R9 differentiates the square waves into positive and negative going pulses. A NOR gate G6 ignores the negative pulses, and applies the positive pulses to a 14-stage counter CO. The latter produces an output at Q14 every 16,384 input pulses. During the night when the output of gate G2 is low, an output at Q14 flips a flip flop composed of two cross-connected NOR gates G7 and G8 and produces a high reset that sets the counter CO to zero. The reset signal remains until daylight and prevents the counter from counting. At sunrise the gate G2 output becomes higher and drives down the output of NOR gate G8 thereby removing the reset signal on counter CO. The latter then begins counting from zero.

During daylight the high G2 output has imposed a continuous low at the output of gate G3 and effectively blocked the square waves from amplifier A4. After sunset the low G2 output "opens" gate G3 which inverts the square wave output of oscillator OS. A second differentiator composed of a capacitor C5 and resistor R10 differentiates the inverted square waves. This produces positive and negative pulses, at the input of NOR gate G6, which are 180° out of phase with the corresponding pulses at the other input of that gate. Thus the positive pulses of the one gate G6 input are 180° displaced from the positive pulses of the other input. The gate G6 ignores the negative input pulses and produces a negative output pulse from each positive pulse at each of its inputs. Thus after sunset the counter is counting twice as many pulses per unit time, i.e., it is counting pulses at twice the rate, than during daylight hours.

This counting continues until the count 16,384 is reached and the flip-flop composed of gates G7 and G8 is reversed so that the high reset signal resets the counter CO. The reversal of flip-flop G7-G8 can occur because of the nighttime low at the output of gate G2. The resistor R8 is set to establish a frequency that causes counter CO to reach its peak count at any particular nighttime hour.

The resistor R6 transmits the high reset signal at the output of gate G8 to the base of transistor Q1. This turns on the transistor Q1 and energizes the relay K. The latter opens the contact k. The open contact k turns off the lamp bank load LO at the aforementioned particular nighttime hour.

For the remainder of the night, until sunrise the high reset signal keeps the lamp bank off. At sunrise the high signal on gate G2 produces a low signal at the output of NOR gate G8 and at the base of transistor Q1. Relay K now allows contact k to close and counter CO starts counting.

In operation, the photoresistor P is exposed to ambient light and at sunrise its lowering resistance causes the voltage across R3 ultimately to cross a threshold which abruptly shifts the output of the quasi Schmitt trigger circuit CR to a high, as shown in FIG. 2. The output of the circuit CR appears at the output of the gate G2 and remains high until sunset when the rising resistance of photoresistor P causes the resistance of resistor R3 to drop below the lower threshold of circuit CR. The circuit CR flips back and forth between its two positions at sunrise and sunset as shown in FIG. 2. The high voltage output of the circuit CR during daylight energizes the transistor Q1 and the relay K to open the contact k and keep the load LO unenergized. The high at the output of circuit CR also imposes a low on the output of NOR gate G8 and prevents the formation of a reset signal for the counter CO. This allows the counter to count during daylight. The pulses counted by the counter are initially formed as square wave pulses at the output of gate G5 as shown in FIG. 3. The differentiator composed of capacitor C4 and resistor R9 differentiates the pulses as shown in FIG. 4. During daylight the output of gate G2 is high and this high imposes a low at the output of NOR gate G3 as shown in FIG. 5. During the nighttime hours, the low at the output of gate G2 ends its imposition of a constant zero output at NOR gate G3 so that the output of NOR gate G3 carries the inverse of the square wave output of gate G5. This is also shown in FIG. 5.

The differentiator composed of capacitor C5 and resistor R10 now differentiates the resulting signal as shown in FIG. 6. The differentiated pulses in FIG. 6, where they appear, have the reverse polarity of the pulses occurring at the same time in FIG. 4. Hence the positive pulses in FIG. 6 are 180° displaced from the positive pulses in FIG. 4. Thus the positive pulses appearing at one input of the NOR gate G6 are spaced between the positive pulses appearing at the other input of NOR gate G6. The NOR gate G6 clips the negative pulses while passing all of the positive pulses at both inputs and inverting these positive pulses. The result appears in FIG. 7. Here the pulse rate at night, that is, between sunset and sunrise is twice that during the daylight hours, i.e. between sunrise and sunset. This is so because during the daylight hours the high on the upper input of the NOR gate G3 prevents pulses from appearing at one of the inputs to the gate G6. Thus during daylight hours, only one input is applying positive pulses to the NOR gate G6. At night the low from the output of gate G2 permits the gate G3 and the differentiator C5, R10 to form displaced positive pulses which the gate G6 can pass.

The counter CO starts to count only after sunrise causes the output of gate G2 to exhibit a high which eliminates the formerly existing high reset signal at the output of gate G8. See sunrise in FIG. 8. The high G2 output latches the flip-flop G7, G8 whose other input at G7 is the output of the counter CO as shown in FIG. 9. This output is 0 at sunrise because the high reset signal has prevented an output at Q14. The counter CO starts counting at the time the signal from G2 becomes high, namely at sunrise, as shown in FIG. 10 and continues counting until the count 16,384 is reached at which point the counter produces an output at Q14 as shown in FIG. 9. This output flips the flip-flop G7, G8 and produces the high reset pulse that prevents the counter CO from counting further as shown in FIG. 10. FIG. 8 illustrates the reset pulse at the output of gate G8.

The signals at the output of gate G2 and G8 control the output of the transistor Q1. When either of the outputs from gate G2 or gate G8 are high, the transistor Q1 conducts. Its collector voltage appears in FIG. 11. When Q1 conducts the collector voltage is low. This energizes the relay K and turns off the lamps in the load LO. When Q1 is nonconductive the contact k closes and allows the lines L-1 and N to energize the lamps in the load LO. The transistor Q1 is nonconductive from sunset to a predetermined time established by the frequency of the oscillator OS and the subsequent pulse rate into the counter CO. If the resistor R7 adjusts the frequency to be greater the lamps will be turned off sooner such as at 10:00 P.M. If the frequency is lower, the lamps will be turned off later such as 2 A.M. In FIG. 11 the lamps are shown to be turned off at midnight. FIG. 12 shows the load energization.

Figure 13:
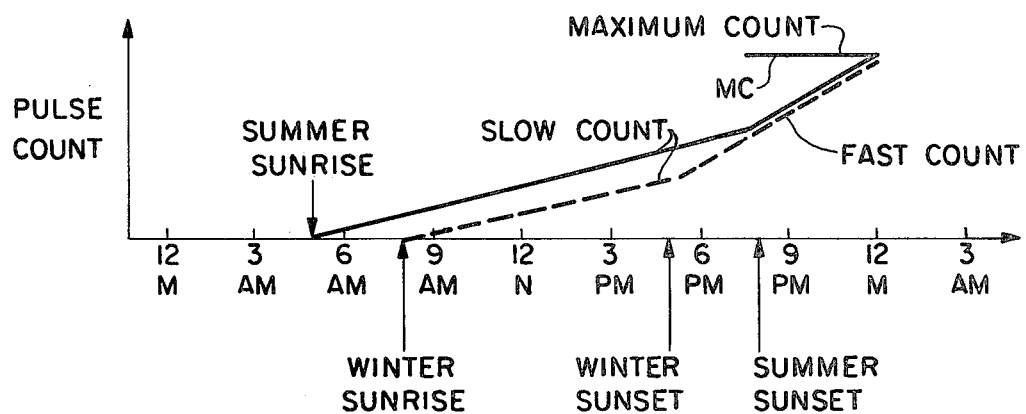
FIG. 13 is a graph illustrating the pulse count at various times during the day when the apparatus in FIG. 1 is used during both the summer and winter.

It has been discovered that in the system of FIG. 1, at any particular frequency of the oscillator OS, the lamp bank in the load will turn off at virtually the same hour of standard time regardless of the season. This can be seen by considering the pulse accumulation rate of the counter for the sunrises and sunsets during the extremes of summer and winter. FIG. 13 is a graph showing time relative to the count within the counter CO both during the summer and the winter.

During the summer we assume that the sunrise is at 5:00 A.M. and sunset at 8:00 P.M. For the winter we assume an 8:00 A.M. sunrise and a 5:00 P.M. sunset. The spread between the summer sunrise and winter sunrise is assumed to be the same as the spread between the winter sunset and summer sunset. These figures assume continuous Standard Time or Daylight Time. In the summer the counter CO begins to count at sunrise at a constant rate as shown by the solid line between the summer sunrise and the winter sunset. At sunset the number of pulses entering the counter doubles. Thus the slope of the pulse count line is doubled in FIG. 13. The curve continues until it reaches a maximum count MC, in this case 16,384.

In winter the counter CO begins counting at sunrise at the same rate as in the summer. The cumulative pulse count is shown for the winter by the broken line. At sunset the slope of this line is also doubled. It has been found that the cumulative pulse count ends at the same Standard (or Daylight) time both in summer and winter.

Figure 14:
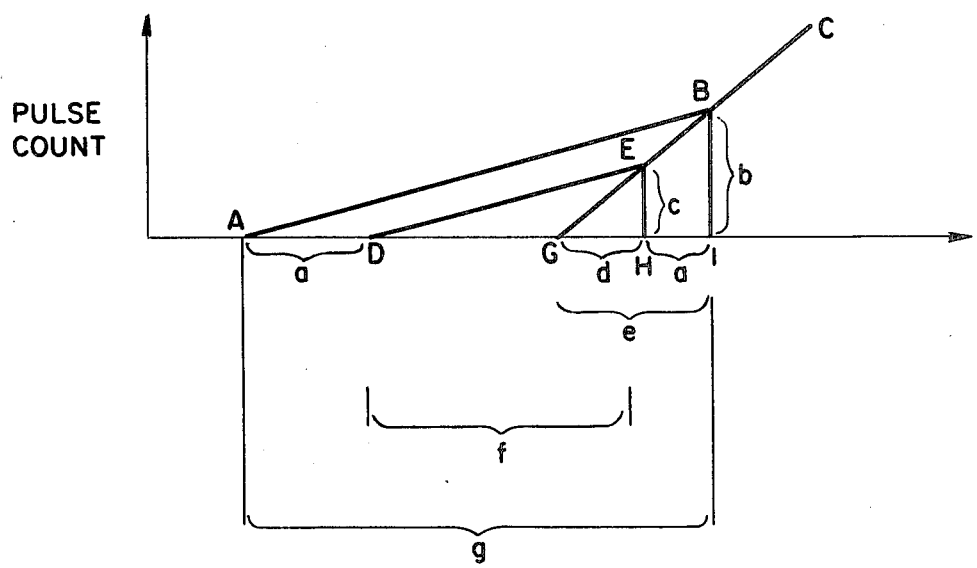
FIG. 14 is a graph utilizing shapes in FIG. 13 for the purpose of illustrating the operation of the system in FIG. 1.

It has been discovered that this doubling of the slope, that is, doubling of the pulses counted produces the limit (16,384) pulse count at the same time both summer and winter. This is so because the difference in time between the summer sunrise and the winter sunrise is substantially the same as the difference in time between the winter sunset and the summer sunset at the same location. This can be seen from FIG. 14. Here the sunrise to sunset pulse counts are shown by lines A, B and D, E, for summer and winter respectively. H and I represent the winter sunset and the summer sunset. The slopes of AB and DE are equal. A line GEBC through the points E and B is a line of unknown slope connecting the sunset pulse counts. From this graph it can be seen that for some particular slope of the line GEBC, the pulse count during the summer and the winter will always be the same, i.e., it will always be at B, by the time I. Since the unknown slope of B to C remains the same, the pulse count will always reach a preset maximum at the same time in both the summer or winter. The slope of the line GEBC can be calculated on the basis of the knowledge that the time difference between summer sunrise and winter sunrise, i.e. A to D, equals the time difference between the winter sunset and summer sunset, i.e. between H and I. Thus in FIG. 14 the distances a are equal to each other. In FIG. 14 the slope of the line AB is equal to the slope of the line DE. Thus the following equations apply:

Slope $AB$ = Slope $DE = b/g = c/f$

Slope $BG$ = Slope $GE = b/e = c/d$

The ratio of the rate at which the pulses are counted in the counter CO is equal to the ratio R of the slopes of BG to AB. Thus $$R = \frac{\text{Slope } BG}{\text{Slope } AB} = \frac{b/e}{b/g} = \frac{c/d}{c/f} = \frac{g}{e} = \frac{f}{d}$$

Because the time differences between the summer sunrise and winter sunrise, and between the winter sunset and summer sunrise are equal, $g = f + 2a$ $e = d + a$ $g/e = (f + 2a)/(d + a) = f/d$ $df + 2ad = df + fa$ $2ad = fa$ $2d = f$ $2 = f/d$ But from above, $R = f/d$ Hence $R = 2$ Thus it can be seen that the ratio R between the two slopes must be 2 for the same number of pulses to have been counted by the counter CO by the time I. Because the counting rate then proceeds at the same fast rate both in the summer and in the winter, the counter will reach its maximum at the same time both in the summer and in the winter.

For this reason, by making the pulse input rate to the counter after sunset twice that between sunrise and sunset it is possible to cause the lights in the load LO to turn out at substantially the same time at night throughout the year without special timing equipment. This is extremely important in saving energy. It prevents light from being turned on needlessly when lamps need only be used from sunset up to a predetermined night-time hour.

Since Daylight Saving Time is an artificial phenomenon which varies, the system must be reset with the resistor R7 for the purpose of changing the time of night at which the system turns off. This involves changing the system from standard time to Daylight Saving Time. However, it may be desirable to allow the system to operate at Standard Time during Daylight Saving Time in any case. All year Daylight Time would avoid this change.

This system is capable of resynchronizing itself in response to power outages. If a power failure occurs when no counting takes place, that is between the shut-off time and the following sunrise, the system is totally unaffected. If a power failure occurs between sunrise and sunset the output of gate G2 will nevertheless turn on the load which will continue to remain on until the maximum count is reached. If the power outage continues beyond the next sunrise, the count will still continue once power is returned until the maximum is reached. The daylight will then produce a high at the output of gate G2 which inhibits the reset on counter CO and counting will begin anew. Since the total count takes less than 24 hours the system will be resynchronized the following day. The lamps in the load LO will in any case be turned on at sunset and remain on while the higher rate of pulses moves the counter toward its maximum.

It is possible that resynchronization may take even an additional day. However, this is quite unlikely.

The maximum count of the counter CO is not required to be any specific value. In fact, the higher the value the better. The counter in FIG. 1 was chosen in view of the prevailing economic situation and the amount of space available in the system. The amplifying inverters A1, A2, A3, and A4 are composed of respective NAND gates because four such gates are conveniently available as part of a single module. In one embodiment each NAND gate represents one-quarter of a CD4011AE module and each NOR gate represents one-quarter of a CD4001AE module. According to this embodiment the counter CO is a divide by 16,384 CD4020AE 14-step counter module. The capacitor C2 is a Milar one microfarad capacitor and the resistor R3 a temperature compensating 15 megohm resistor. The values of capacitors C4 and C5 are 0.002 microfarads and the values of resistors R8 and R9 are 27K. Each of the resistors R5 and R6 are, according to an embodiment of the invention, 27K.

It will be evident that the invention can be practiced without using a counter and simply charging suitable capacitors at appropriate rates until they reach a threshold value. However, charging capacitors at the slow rates required creates inaccuracies which are not acceptable in the lighting environment disclosed.

The system according to the invention may be used to provide a specific function in response to anyone of a number of cyclical events. If the periods of such events are sufficiently short, it may be possible to utilize the aforementioned charging capacitors.

As used herein, the terms high and low refer to discrete voltage values, but are also used interchangeably with 1 and 0 in the logic sense.

It will be recognized that the system of FIG. 1 can be modified to serve other purposes such as turning on an air conditioner at sunrise and turning it off at a specified nighttime hour. This can be accomplished for example by interposing a forward diode and a monostable flip-flop between the output of the gate G2 and the resistor R5. The time of the monostable flip-flop is short so that it turns off the relay almost immediately after sunrise.

While specific embodiments of the invention have been shown and described in detail to illustrate the application of the inventive principles, it will be understood that the invention may be embodied otherwise without departing from such principles.

What is claimed is:

1. An apparatus for controlling a load in response to cyclically occurring events whose times vary within the cycle, comprising sensing means for sensing each event in each cycle, signal generator means for generating signals, storing means for storing signals until a predetermined signal count level has been reached, actuator means for actuating and deactuating the load, circuit means for coupling said generating means to said sensing means and said storing means to said generating means and the actuator means to the storing means and the sensor means for causing the generating means to generate the signals at a first rate and starting said storing means counting the signals in response to said sensing means sensing one of the events and to generate the signals at a second rate and to keep said storing means counting the signals in response to the sensing means sensing the other event in the cycle and for causing said actuator means to place the load in one operating mode in response to the sensor sensing the other event and to place the load in another mode in response to the storing means reaching the predetermined value.

2. An apparatus as in claim 1, wherein said signal generating means is a pulse generator, and said storing means is a counter.

3. An apparatus as in claim 2, wherein said signal generating means includes rate changing means for changing the rate of the signals so as to establish the time in which the counter reaches its predetermined value.

4. An apparatus as in claim 1, wherein said generating means includes a waveform generator for generating waveforms at the first rate, means for shifting the phases of the waveforms and producing an output of both phases, and means for combining components of the waveforms at both phases, and said circuit means includes means for inhibiting the output of one of the phases in response to said sensing means.

5. An apparatus as in claim 3, wherein said rate changing means includes a waveform generator for generating waveforms at the first rate, means for shifting the phases of the waveforms and producing an output of both phases, means for forming pulses from components of the both phases, and means for combining the pulses from both phases, and said circuit means includes means for inhibiting the output of one of the phases in response to said sensing means.

6. An apparatus as in claim 1, wherein said actuating means includes gate means responsive to said sensing means and said storing means for responding to one or both of said sensing means and said storing means.

7. An apparatus as in claim 2, wherein said actuating means includes gate means responsive to said sensing means and said storing means for responding to one or both of said sensing means and said storing means.

8. An apparatus as in claim 3, wherein said actuating means includes gate means responsive to said sensing means and said storing means for responding to one or both of said sensing means and said storing means.

9. An apparatus as in claim 5, wherein said actuating means includes gate means responsive to said sensing means and said storing means for responding to one or both of said sensing means and said storing means.

10. An apparatus as in claim 1, wherein said sensing means includes a photosensitive device for producing one output in response to daylight and a second output in response to absence of daylight.

11. An apparatus as in claim 10, wherein said signal generating means is a pulse generator, and said storing means is a counter.

12. An apparatus as in claim 10, wherein said signal generating means includes rate changing means for changing the rate of the signal so as to establish the time in which the counter reaches its predetermined value.

13. An apparatus as in claim 10, wherein said generating means includes a waveform generator for generating waveforms at the first rate, means for shifting the phases of the waveforms and producing an output of both phases, and means for combining components of the waveforms at both phases, and said circuit means includes means for inhibiting the output of one of the phases in response to said sensing means.

14. An apparatus as in claim 12, wherein said rate changing means includes a waveform generator for generating waveforms at the first rate, means for shifting the phases of the signals and producing an output of both phases, means for forming pulses from compounds of the both phases, and means for combining the pulses from both phases, and said circuit means includes means for inhibiting the output of one of the phases in response to said sensing means.

15. An apparatus as in claim 10, wherein said actuating means includes gate means responsive to said sensing means and said storing means for responding to one or both of said sensing means and said storing means.

16. An apparatus as in claim 1, wherein the second rate is substantially twice the first rate.

17. An apparatus as in claim 2, wherein the second rate is substantially twice the first rate.

18. An apparatus as in claim 3, wherein the second rate is substantially twice the first rate.

19. An apparatus as in claim 4, wherein the second rate is substantially twice the first rate.

20. An apparatus as in claim 5, wherein the second rate is substantially twice the first rate.

21. An apparatus as in claim 6, wherein the second rate is substantially twice the first rate.

22. An apparatus as in claim 9, wherein the second rate is substantially twice the first rate.

23. An apparatus as in claim 10, wherein the second rate is substantially twice the first rate.

24. An apparatus for controlling a load in response to cyclically occurring events whose times vary within the cycle, comprising sensing means for sensing each event in each cycle, signal generator means for generating signals, storing means for storing signals until a predetermined signal level has been reached, actuator means for actuating and deactuating the load, circuit means for coupling said generating means to said sensing means and said storing means to said generating means and the actuator means to the storing means and the sensor means for causing the generating means to generate the signals at a first rate in response to said sensing means sensing one of the events and to generate the signals at a second rate in response to the sensing means sensing the other event in the cycle and for causing said actuator means to place the load in one operating mode in response to the sensor sensing the other event and to place the load in another mode in response to the storing means reaching the predetermined value, said sensing means including a photosensitive device for producing one output in response to daylight and a second output in response to absence of daylight.

25. An apparatus as in claim 24, wherein said signal generating means is a pulse generator, and said storing means is a counter.

26. An apparatus as in claim 24, wherein said signal generating means includes rate changing means for changing the rate of the signal so as to establish the time in which the counter reaches its predetermined value.

27. An apparatus as in claim 24, wherein said generating means includes a waveform generator for generating waveforms at the first rate, means for shifting the phases of the waveforms and producing an output of both phases, and means for combining the components of the waveforms at both phases, and said circuit means includes means for inhibiting the output of one of the phases in response to said sensing means.

28. An apparatus as in claim 26, wherein said rate changing means includes a waveform generator for generating waveforms at the first rate, means for shifting the phases of the waveforms and producing an output of both phases, means for forming pulses from components of both phases, and means for combining the pulses from both phases, and said circuit means includes means for inhibiting the output of one of the phases in response to said sensing means.

29. An apparatus as in claim 24, wherein said actuating means includes gate means responsive to said sensing means and said storing means for responding to one or both of said sensing means and said storing means.

30. An apparatus as in claim 24, wherein the second rate is substantially twice the first rate.

* * * * *